United States Patent

Smith

[11] Patent Number: 5,987,379
[45] Date of Patent: Nov. 16, 1999

[54] CREATION AND MONITORING OF VARIABLE BUFFER ZONES

[75] Inventor: Steve Smith, Sunnyvale, Calif.

[73] Assignee: Trimble Navigation Limited, Sunnyvale, Calif.

[21] Appl. No.: 08/960,730

[22] Filed: Oct. 30, 1997

[51] Int. Cl.⁶ ............................... G06G 7/78; G08B 5/22
[52] U.S. Cl. ................ 701/207; 340/825.37; 340/573.4; 340/539; 340/825.54; 379/38; 119/721; 119/908
[58] Field of Search ...................................... 701/207, 200, 701/117, 301; 73/178 R; 340/988, 990, 995, 825.54, 825.37, 539, 573.4, 825.38, 573.3, 825.31, 531, 573.1, 825.49, 514, 940; 342/357, 463, 455, 29; 379/38; 119/720, 908, 721, 859, 502

[56] References Cited

U.S. PATENT DOCUMENTS

| | | | |
|---|---|---|---|
| 4,646,244 | 2/1987 | Bateman et al. | 701/301 |
| 4,887,064 | 12/1989 | Drori et al. | 340/426 |
| 4,898,120 | 2/1990 | Brose | 119/29 |
| 4,910,500 | 3/1990 | Carr | 340/573 |
| 4,952,913 | 8/1990 | Pauley et al. | 340/573 |
| 4,952,928 | 8/1990 | Carroll et al. | 340/825.54 |
| 4,967,695 | 11/1990 | Giunta | 119/29 |
| 5,086,290 | 2/1992 | Murray et al. | 340/539 |
| 5,121,711 | 6/1992 | Aine | 119/29 |
| 5,134,472 | 7/1992 | Abe | 348/700 |
| 5,204,670 | 4/1993 | Stinton | 340/825.54 |
| 5,212,547 | 5/1993 | Otsuki | 348/139 |
| 5,218,344 | 6/1993 | Ricketts | 340/573 |
| 5,241,923 | 9/1993 | Janning | 119/721 |
| 5,265,556 | 11/1993 | Hall | 116/63 P |
| 5,266,944 | 11/1993 | Carrol et al. | 340/825.36 |
| 5,408,956 | 4/1995 | Quigley | 119/720 |
| 5,438,608 | 8/1995 | Kojima | 379/58 |
| 5,497,149 | 3/1996 | Fast | 340/988 |
| 5,541,845 | 7/1996 | Klein | 701/207 |
| 5,568,119 | 10/1996 | Schipper et al. | 340/825.37 |
| 5,632,232 | 5/1997 | Waters | 119/720 |
| 5,646,855 | 7/1997 | Jones et al. | 364/448 |
| 5,661,474 | 8/1997 | Douglas | 340/940 |
| 5,751,973 | 5/1998 | Hassett | 705/13 |

OTHER PUBLICATIONS

Scot D. Elliot & Daniel J. Dailey, "Wireless Communications For Intelligent Transporation Systems," chapter 1, pp. 1–32, Artech House Inc., 1995.

D.M. Balston, C. Watson, "Cellular Radio Systems," D.M. Balston & R.C.V. Macario (eds.), chapters 6 & 7, pp. 153–206, Artech House Inc., 1993.

*Primary Examiner*—Jacques H. Louis-Jacques
*Attorney, Agent, or Firm*—Wagner, Murabito & Hao LLP

[57] ABSTRACT

A system for monitoring operation and location of a movable entity, such as a person, vehicle, movable equipment item or movable structure, at an activity site, such as a construction or mining site, that carries a location determination (LD) signal module to determine the entity's present location. When a restricted or hazardous activity occurs without warning (emergency) or is scheduled to occur at a selected location (fixed or moving) and selected time interval on the site, a buffer zone surrounding the restricted activity location is determined, and any movable entity that is within or will come within the buffer zone is advised to move or be moved elsewhere during the time the restricted activity occurs, unless the movable entity has an associated priority that is greater than an associated priority for the restricted activity. The buffer zone may vary with time in size, location and other characteristics. Complex buffer zones, resulting from overlap of two or more activated buffer zones, can also be created and monitored. Signals can be received by the LD module from sources such as GPS, GLONASS and LEO satellites, or from ground-based signal sources such as Loran signal towers.

25 Claims, 6 Drawing Sheets

CREATION AND MONITORING OF VARIABLE BUFFER ZONES

FIELD OF THE INVENTION

This invention relates to creation of a buffer zone surrounding a movable or stationary structure, from which personnel and other structures are to be excluded or activities constrained for a selected time interval.

BACKGROUND OF THE INVENTION

Some activities ("restricted activities") at a construction, mining or similar site are sufficiently hazardous that site personnel and equipment are excluded from, or the associated activities are constrained within, a region, referred to here as a buffer zone, that surrounds the location(s) where the restricted activity occurs. If the restricted activity is more or less continuous and the location or activity site where the restricted activity occurs is fixed or stationary, a permanent buffer zone can be defined and imposed surrounding the restricted activity site. However, many hazardous activities occur only over a limited time interval and/or the restricted activity site may move with time. For example, a truck delivering potentially unstable explosives may move (slowly) across a construction or mining site to a location where the explosives will be used. In this situation, it may be preferable to define a buffer zone that is not fixed but can vary with time.

Creation of, or prediction of locations for, stationary exclusion zones and the like, that control access to a specified area, are disclosed in several U.S. Patents. However, these exclusion zones, once created, do not move or undergo changes in size or other characteristics. Such an exclusion zone may be appropriate for a fixed structure, such as a building, with a fixed function that gives rise to the exclusion; but creation of such a zone would be of little help where the structure moves or the zone itself appears and disappears, or undergoes a change in size or other characteristics or a change in priority of an activity associated with the structure, with the passage of time.

What is needed is a system for creating and subsequently monitoring a variable buffer zone whose location, size and/or character can change with time to correspond to the location, size, priority and nature of a potential threat of a restricted activity site located within a larger site, such as a construction or mining site. The variable buffer zone (1) is activated at a fixed location but only for a limited time interval or (2) is activated in a region whose size and/or location changes with time or (3) corresponds to a restricted activity whose nature changes with time. Preferably, the system should permit the buffer zone size to vary according to the type and hazard level of the restricted activity. Preferably, the system should permit assignment of priority indices and/or hazard indices to activities and should allow the possibility that one or more high priority activities are permitted to continue within an activated buffer zone, while other lower priority activities are constrained or stopped altogether. Preferably, the system should permit transmission of indicia that define or otherwise describe the location, size or status of the buffer zone as time changes and should facilitate receipt and use of this information by a central system and by autonomous information-receiving units carried by persons, vehicles and other movable and non-movable structures on or near the site. Preferably, the system should allow for possible overlap of activated buffer zones.

SUMMARY OF THE INVENTION

These needs are met by the invention, which provides a system that uses location determination (LD) signals and indicia defining the restricted activity site, whose location, size and/or characteristics may change with time, to advise site personnel and equipment to avoid or to constrain activities within a specified region when a variable buffer zone is activated for that region. The buffer zone can appear or become activated at one time and disappear, grow or shrink in size or change character at one or more subsequent times. Where creation, activation, deactivation or change in priority of a buffer zone is scheduled for, or is ongoing during, a given buffer activation time interval, on a portion of the site, site personnel, vehicles, movable equipment and movable structures, such as portable laboratories ("movable entities"), (1) can be advised before this buffer activation time interval arrives, and (2A) can be moved to other portions of the site that are not within the buffer zone or (2B) can pursue constrained activities within an activated buffer zone.

Optionally, the system computes or assigns a priority and/or hazard index to each work activity and to each foreseeable restricted activity at the site. If a movable entity is pursuing a work activity having a higher priority than a given restricted activity, the movable entity may continue its activity (possibly with some constraints on its actions) within an activated buffer zone. The system can create and monitor a complex buffer zone, where two or more activated buffer zones overlap geographically and temporally.

Each movable entity preferably carries an LD module that receives LD signals and estimates the LD module present location and that includes a communications module that exchanges information, on LD module present location, on the movable entity status, and on scheduled or ongoing restricted activities, with a central station that monitors these locations and activities on the site. An emergency situation can be handled by the central station as an unscheduled restricted activity, and all movable entities can be advised of the nature and location of the emergency.

DESCRIPTION OF BEST MODE OF THE INVENTION

Figure 1:
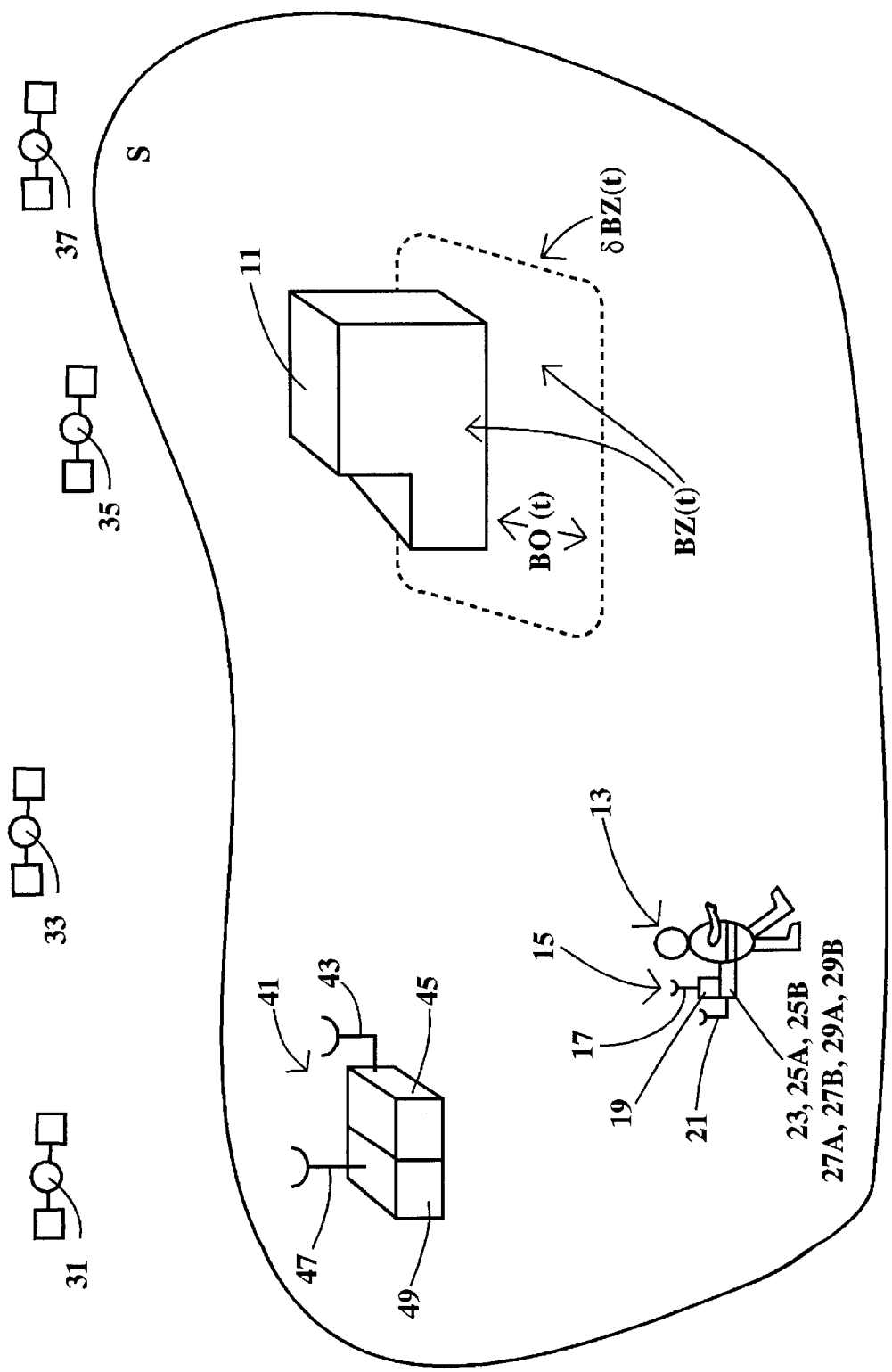
FIGS. 1, 3 and 4 illustrate three situations for practicing the invention.
Figure 3:
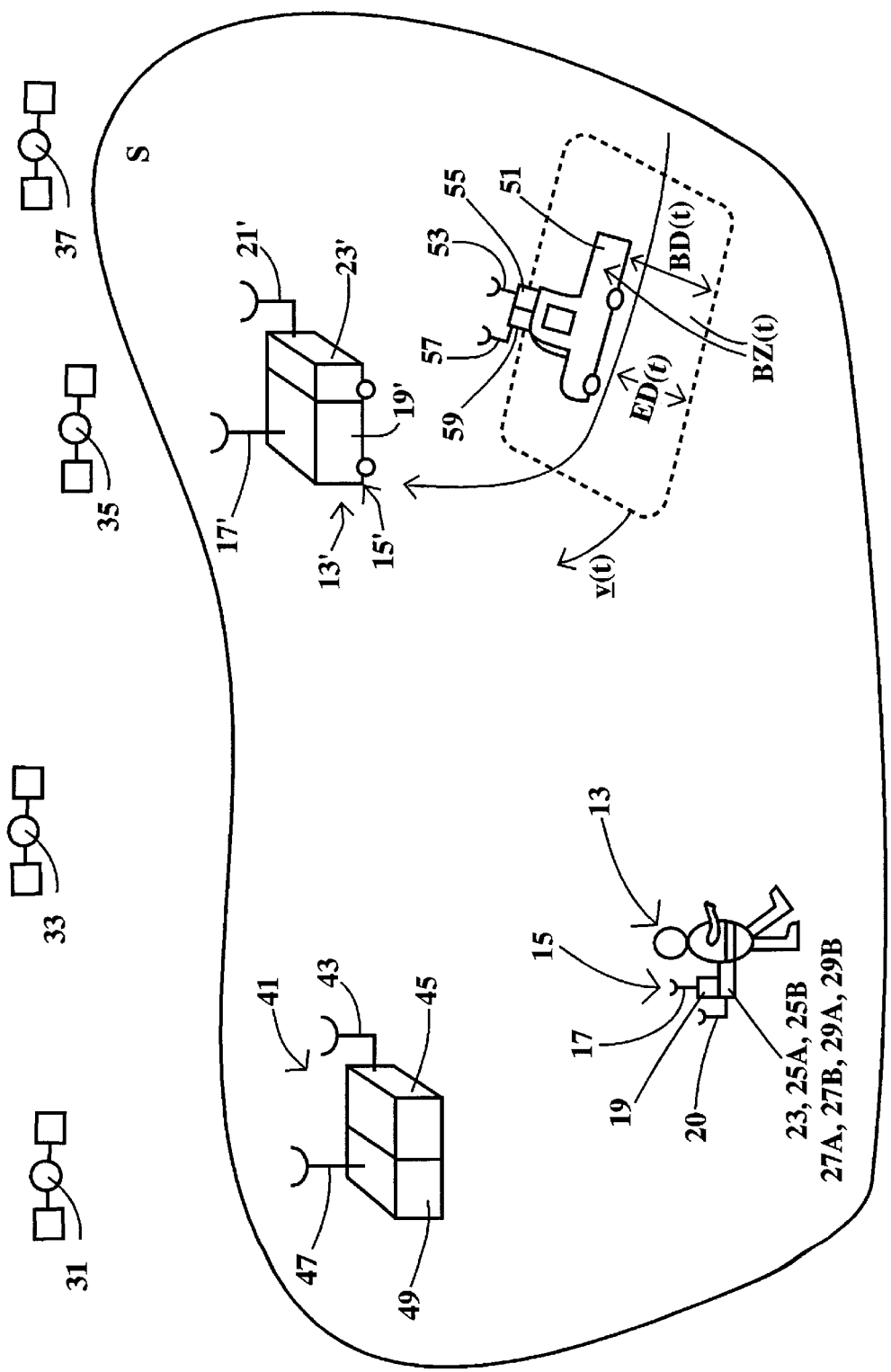

FIG. 1 illustrates one use of the invention on an activity site S, such as a construction or mining site in which one or more restricted activities are pursued in a designated structure 11 from time to time. Pursuit of a restricted activity within or at the structure 11 is scheduled for a given restricted activity time interval $t1 \leq t \leq t2$, and a buffer zone $BZ(t)$ is to be created and monitored before, during and after this time interval. The buffer zone $BZ(t)$ may include the structure 11, or a specified portion thereof, and all locations within a selected exclusion distance $ED(t)$ (e.g., 100 meters) of any part of the structure, as illustrated in FIG. 1. If the location and/or size of the buffer zone $BZ(t)$, or nature of the restricted activity, is changing with time, it may be appropriate to specify the geographic region covered by the buffer zone and the velocity vector $v(t)$ of a representative point in the buffer zone (FIG. 3).

Each person or other movable entity 13 present on the site S in FIG. 1 preferably has attached thereto a location determination (LD) module 15, which includes an LD signal antenna 17 and associated LD signal receiver/processor 19, that receive and analyze LD signals from two or more LD signal sources 31, 33, 35, 37 that may be located on the site or may be spaced apart from the site. An LD signal source may be a ground-based LD signal source, such as a Loran, Tacan, Decca or Omega signal tower, or preferably may be a satellite-based signal source carried by a satellite that is part of a Global Positioning System (GPS), Global Orbiting Navigational Satellite System (GLONASS), or a Low Earth Orbit (LEO) system such as the Motorola Iridium system. The LD module 15 also includes an associated communications antenna 21 and associated communications receiver (or transceiver) 23 that receive signals from (and optionally transmit signals to) one or more other transmitters or transceivers located on or near the site S. The LD module 15 preferably includes a visually perceptible display 25A and/or an audibly perceptible display 25B that advises the movable entity 13 of the movable entity's location relative to the buffer zone BZ(t), of the restricted activity buffer activation time interval in advance of the beginning of this time interval and of other useful information related to restricted activities occurring on the site S. The beginning and ending times for the buffer activation time interval need not be precisely specified, and best estimates may be used here. Optionally, the LD module 15 also compares the priority of the movable entity's present or assigned activity within a buffer zone (entered by the movable entity or by a central system) with the priority of the scheduled restricted activity, determines whether (1) the movable entity should be excluded from the activated buffer zone or (2) the movable entity may continue to pursue its present activity (possibly with some constraints imposed) within the activated buffer zone.

Not all movable entities will be able to move out of or away from the buffer zone at the same rate. Optionally, the system includes a memory or other repository that includes information on a representative maximum velocity v(mov;max) at which a given movable entity can move. A movable entity within a buffer zone may not be able to move directly to the nearest buffer zone boundary in order to remove itself from the buffer zone. The system optionally includes a specified path (and associated path length) the movable entity will follow in moving out of the buffer zone. The system takes the maximum velocity and path length into account in determining when to notify a given movable entity of a scheduled activation of a buffer zone that will include the movable entity's present location. For example, if the movable entity is within an scheduled activated buffer zone, if the movable entity must move along a path of length L(mov) to reach a boundary of the buffer zone (e.g., nearest boundary point), and if the buffer zone is scheduled to be activated at an estimated time t=t1, the system will notify the given movable entity, at some time before the time $$t=t1-L(mov)/v(mov;max), \qquad (1)$$

is reached, that a relevant buffer zone will be activated at the time t=t1. These computations by the system can be made at a central station or by a data processor that is attached to the movable entity.

Figure 2:
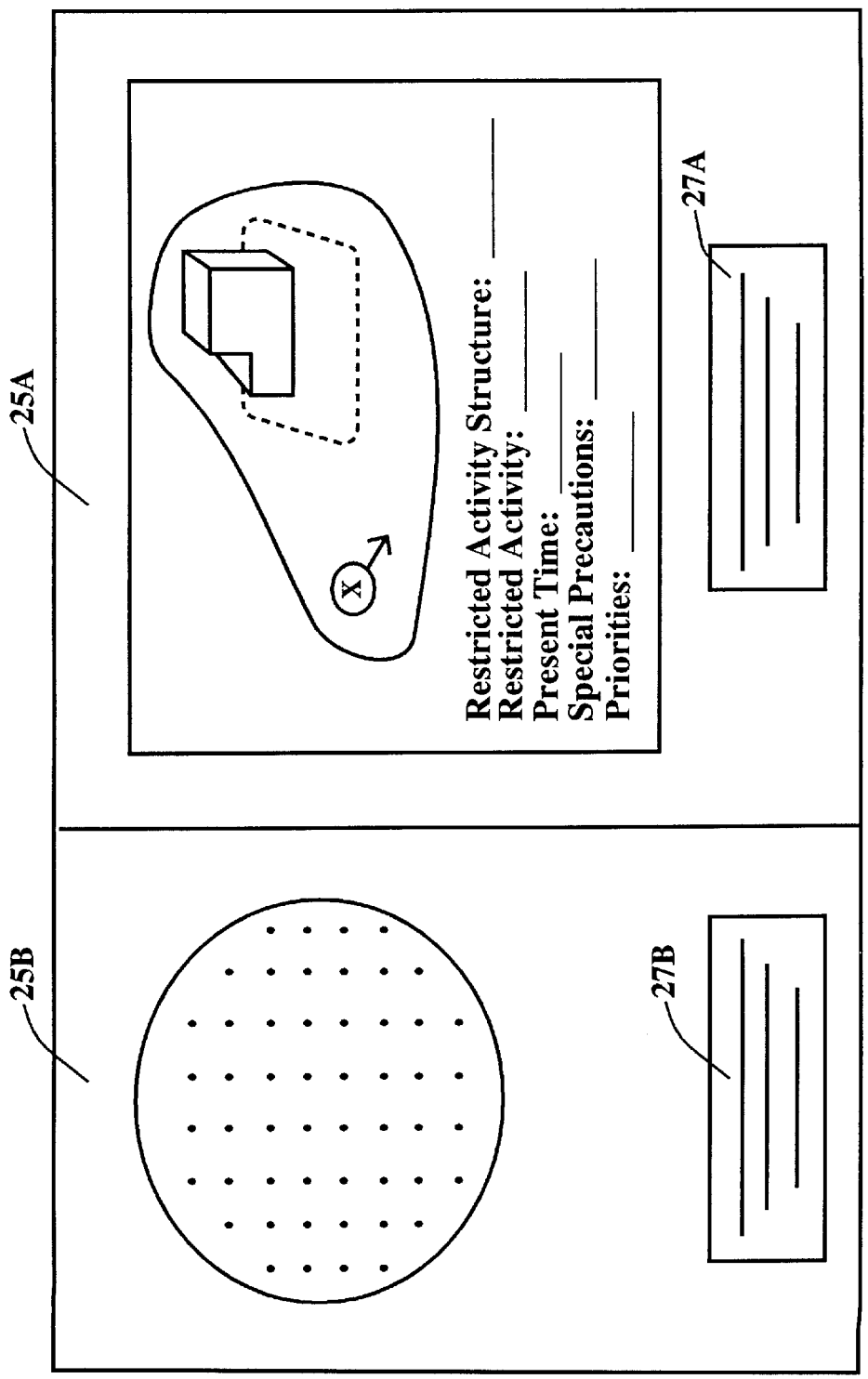
FIG. 2 illustrates visual and audible displays that may be provided by to the invention.

An audible display 25B, illustrated in FIG. 2, that is part of the LD module 15, is connected to the transceiver 23 and may audibly advise the movable entity 13 to which the LD module 15 is attached of any or all of the following information: (1) a general description of the extent of the buffer zone BZ(t); (2) the movable entity's present location relative to the buffer zone and its boundary δBZ(t); (3) the (estimated) beginning and ending time for the restricted activity time interval and the present time; (4) the nature of the restricted activity that will occur; (5) any special precautions that this particular movable entity should observe concerning this restricted activity; (6) whether the movable entity is excluded from the activated buffer zone; and (7) whether the movable entity may continue its present activities (possible with some constraints imposed) in the activated buffer zone. The audible display 25B includes a loudspeaker or similar device for audible communication and optionally includes a keyboard or other command entry device 27 that can be used to enter a request for audible display of particular information related to a restricted activity.

A visual display 25A, illustrated in FIG. 2, that is part of the LD module 15, is connected to the transceiver 23 and may visually advise the movable entity 13 to which the LD module 15 is attached of any or all of the following information on a display screen: (1) a map of the relevant part of the site S and a curve (preferably closed) representing the boundary δBZ(t) of the buffer zone and the buffer zone BZ(t) itself, preferably in a contrasting color or cross-hatched area; (2) the movable entity's present location vector r(t) and/or velocity vector or bearing vector v(t) relative to the buffer zone; (3) the (estimated) restricted activity buffer activation time interval and the present time; (4) the nature of the restricted activity that will occur; (5) any special precautions that this particular movable entity should observe concerning this restricted activity; (6) whether the movable entity is excluded from the activated buffer zone; and (7) whether the movable entity may continue its present activities (possible with some constraints imposed) in the activated buffer zone. Audible or visual display of the restricted activity time interval may be repeated at periodic intervals, such as once every 15–180 sec, before the beginning of this buffer activation time interval. The visual display 25A includes the display screen or similar device for visual communication and optionally includes a keyboard or other command entry device 27 that can be used to enter a request for visual display of particular information related to a restricted activity or movable entity location or status, or to enter information on the movable entity's present activities, location or status.

Coordination of audible and/or visual displays for this restricted activity information is preferably performed at a central processing station 41 (FIG. 1) that may be located on the site S or elsewhere. The central station 41 includes a communications antenna 43 and communications transmitter (or transceiver) 45 that broadcast this information, for receipt by the communications antenna 21 and communications receiver 23 that are part of the LD module 15 attached to the movable entity 13 that is present on the site S. The central station 41 optionally provides restricted activity information on more than one restricted activity that may occur on the site S at about the same time. Optionally, the central station 41 has a known location, receives LD signals itself through an LD signal antenna 47 and an LD signal receiver/processor 49, and computes and transmits LD differential correction signals and/or real time kinematic (RTK) signals that provide carrier phase data and/or other supplemental information for the LD signals received by an LD module 15 worn or carried by a movable entity 13 on the site S. Code phase signals, carrier phase signals and/or Doppler data signals can be used to determine the location of an LD module 15.

Optionally, an LD module 15 or the central system 41, or both, includes a list of site activities and the priority assigned to each site activity and to each foreseeable restricted activity. When a restricted activity is scheduled or occurs without scheduling (e.g., an emergency situation), the LD module 15 and/or the central station 41: compares the priority of the present activity of a movable entity 13 with the priority of the restricted activity; determines whether (1) the movable entity is excluded from the activated buffer zone or (2) the movable entity may continue its present activities (possibly with some constraints imposed) in the activated buffer zone; and advises the movable entity of this determination.

If the circumstances of the restricted activity change, either voluntarily or involuntarily, such as a change in the size or shape or location of the buffer zone, or change in the character of the restricted activity, or activation of another adjacent or overlapping buffer zone, the central station 41 transmits this changed circumstance information, either as part of a periodic transmission of restricted activity information or at one or more other appropriate times, through exception reporting, to advise the movable entity 13 to which the LD module 15 is attached of the changed circumstances. Preferably, all movable entities 13 on the site S receive restricted activity information, and any relevant changes in this information, from the central station 41, acting as a site information clearinghouse.

FIG. 3 illustrates an embodiment of the invention in which the buffer zone BZ(t) moves with a designated movable entity 51 (shown as a vehicle in FIG. 3 for purposes of illustration) that is part of a restricted activity that is occurring, or will occur, on the site S. Here, the buffer zone BZ(t) includes the designated movable entity 51 and all locations within a selected buffer distance BD(t) of any part of the designated movable entity, shown at a selected sequence of times $t=t'_k$ ($k=1, 2, 3, \ldots$). In this situation, the buffer zone BZ(t) moves with and is defined with reference to the location of the designated movable entity 51, and the physical extent of this buffer zone may change with passage of time t. A movable entity 13 on the site S again has attached thereto an LD module 15 that receives and analyzes LD signals from two or more LD signal sources 31, 33, 35, 37 and receives and displays transmissions from a central station 41, as in the discussion of FIG. 1. The designated movable entity 51 may be a person transporting a hazardous substance, a vehicle that delivers hazardous material to a designated location on the site S, or movable equipment or a portable structure (self-powered or otherwise) that is transportable onto or within the site and that is involved in a restricted activity. A vehicle, movable equipment item or portable structure may have an "overhang" that itself requires a buffer zone.

Figure 4:
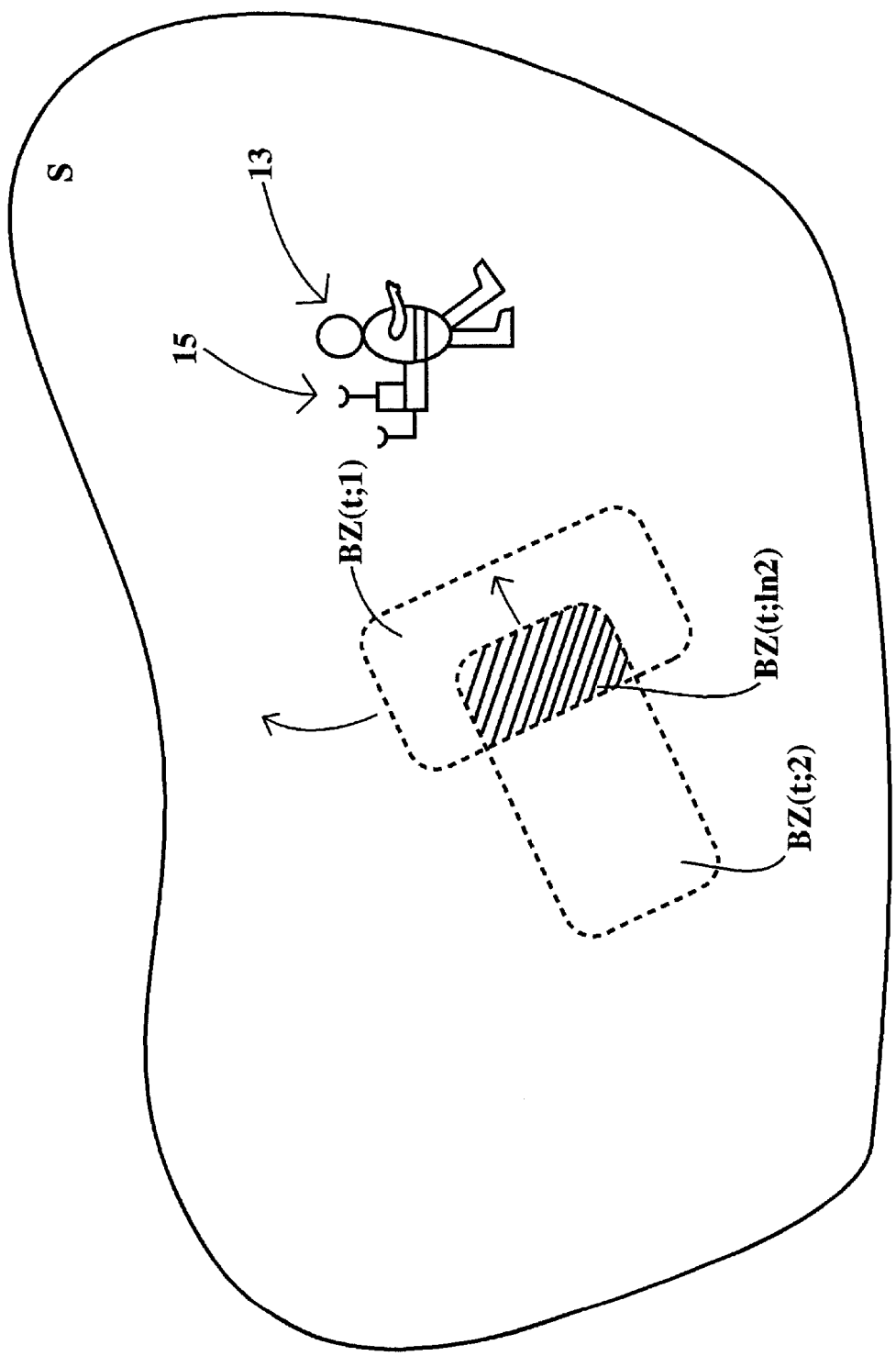

Two or more buffer zones, BZ(t;1) and BZ(t;2), may be activated in an overlapping time interval $\Delta\tau(1;2)$ at the site S, and these buffer zones may partly or fully overlap spatially, thus creating a complex buffer zone BZ(t;1;2) ), as shown in FIG. 4. Within the overlap time interval $\Delta\tau(1;2)$, each of the nonoverlapping portions of the zones BZ(t;1) and BZ(t;2), is treated according to the nature and priority assigned to the corresponding restricted activity. Within the overlap time interval $\Delta\tau(1;2)$, the priority assigned to an overlap region, BZ(t;1∩2), is at least equal to the maximum of the priorities for the buffer zones BZ(t;1) and BZ(t;2), and this overlap region priority may be greater due to synergistic effects. The activity priority for each movable entity 13 that is within the overlap region BZ(t;1∩2) of the complex buffer zone BZ(t;1;2) is then compared with the overlap region priority to determine whether the movable entity is excluded from, or allowed to continue it's activities within, the overlap region during the overlap time interval.

Alternatively, each of the restricted activities may be assigned a hazard index, Haz(t;1) and Haz(t;2), each of which increases with the perceived hazard associated with the restricted activity. A hazard index Haz(t;i) (i=1, 2) may take into account the health and/or safety characteristics of any hazard associated with the restricted activity, as well as other characteristics, such as long-term versus short term effects, regulatory compliance and reporting requirements. In a complex buffer zone such as the overlap zone BZ(t;1∩2), the hazard index associated with this overlap zone may be the maximum of the hazard indices associated with the buffer zones BZ(t;1) and BZ(1;2) or may be greater than or less than this maximum, due to synergistic effects arising from the presence of the two restricted activities in the buffer zone. FIGS. 1, 3 and 4 illustrate use of the invention to advise a movable entity 13 on the site S concerning a scheduled, unscheduled or presently ongoing restricted activity on the site. A movable entity 13 carries or has attached thereto an LD module 15 that receives and analyzes LD signals and determines the present location of itself. If the movable entity 13 is presently at a location that is within or will come within an activated buffer zone BZ(t) for a scheduled or ongoing restricted activity, the movable entity 13 can automatically report its present location to the central station 41. The central station 41 can then broadcast a message to site personnel that (1) the movable entity 13 is to be moved away from any part of the site that will become part of an activated buffer zone BZ(t) for the scheduled or ongoing restricted activity at any future time t or (2) the movable entity may continue to pursue it's present activities (possibly, with some constraints imposed) within the activated buffer zone. Self-reporting of location and present activity by a movable entity, including a designated movable entity that participates in a restricted activity, on the site can thus be used to indicate the presence of that movable entity, whose present location is within or defines a future buffer zone BZ(t) for a scheduled or ongoing restricted activity.

Figure 5:
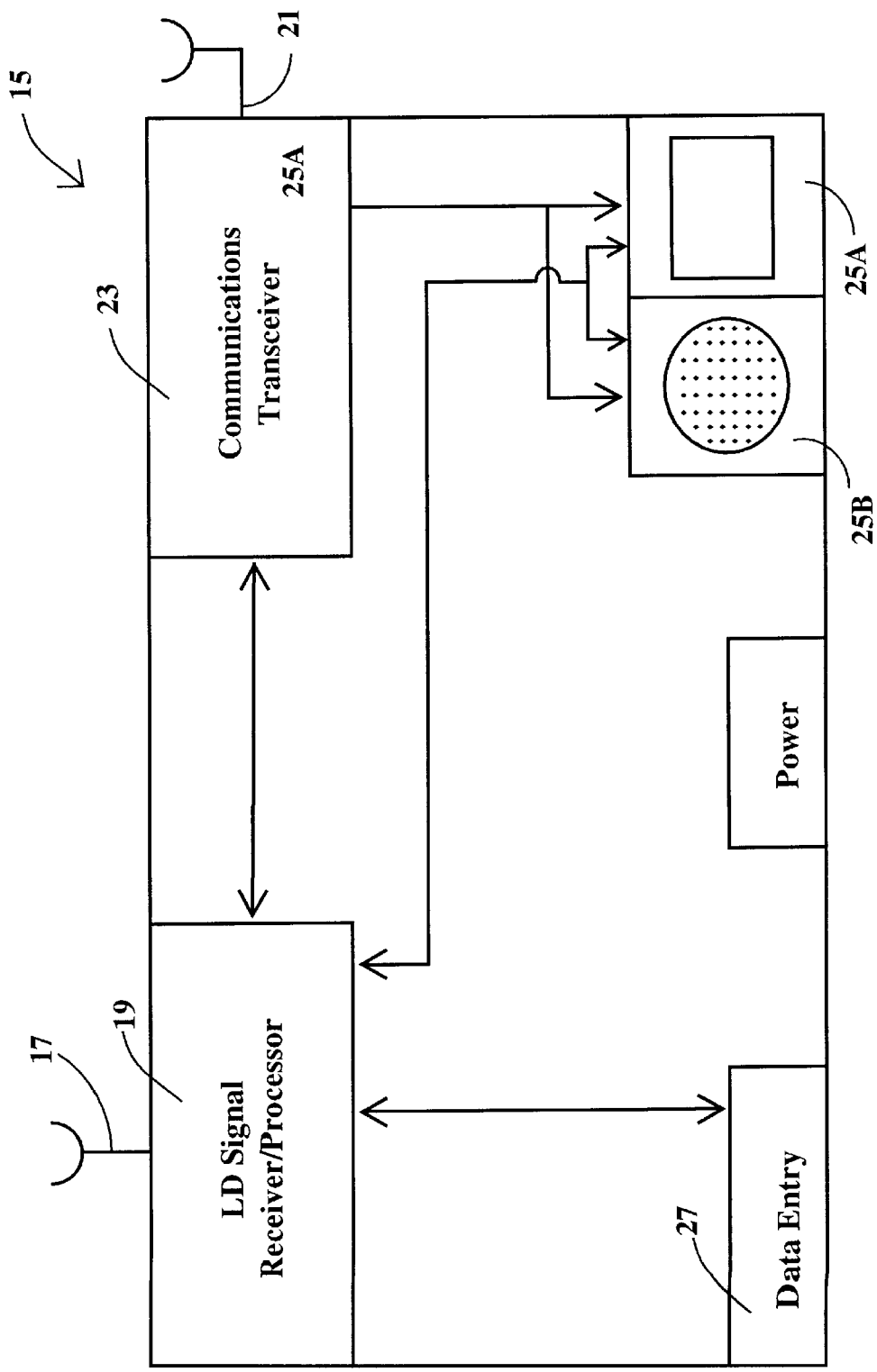
FIG. 5 is a schematic view of apparatus for practicing the invention.

FIG. 5 is a schematic view of an LD module 15 that may be attached to a movable entity 13 and may be used to practice the invention. The LD module 15 includes an LD signal antenna 17, an LD signal receiver/processor 19, a communications antenna 21, a communications receiver (or transceiver) 23, and at least one of a visual display 25A and/or an audible display 25B. The LD module optionally includes a keyboard or other data entry device 27, which is used to enter requests for information, or to answer requests for information, concerning the movable entity's present status, present work activity, present location and/or other concerns.

Figure 6:
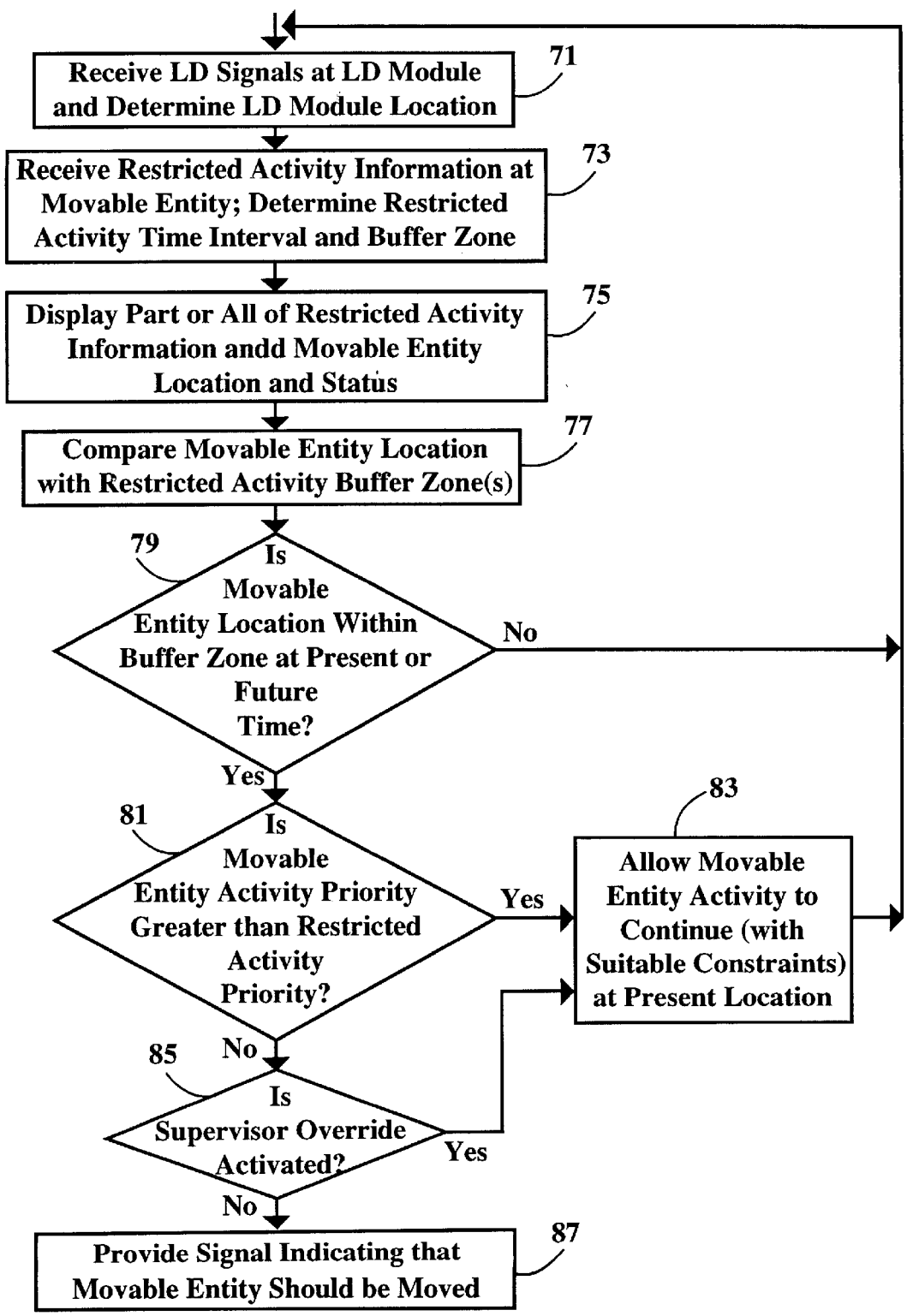
FIG. 6 is a flow chart illustrating a procedure for practicing the invention for restricted activities.

FIG. 6 is a flow chart illustrating a procedure for practicing the invention. In step 71, an LD module carried by a movable entity on a site S receives LD signals and determines or estimates its present location. In step 73, the movable entity (or a communications module associated with the entity) receives information concerning a scheduled or presently ongoing restricted activity on the site S and determines a suitable buffer zone and associated time interval for the restricted activity (which may be different for each movable entity). In step 75 (optional), the system displays information on the restricted activity and/or the entity's present location and present status (work activity, priority, etc.). In step 77, the system compares the entity's present location vector with the buffer zone or zones BZ(t) associated with the restricted activity or activities. In step 79, the system determines if the movable entity present location is now within, or will come within, a buffer zone BZ(t) for the restricted activity. If the answer to the question in step 79 is "no,", the system recycles to step 71 or to another suitable point in the procedure. If the answer to the question in step 79 is "yes," the system then optionally inquires, in step 81, if the movable entity present work activity priority is greater than the restricted activity priority? If the answer to the question in step 81 is "yes," the system allows the movable entity to continue it's present activities (with any suitable constraints imposed), in step 83, and recycles to step 71 or to another suitable point in the procedure. If the answer to the question in step 81 is "no," or if step 81 is not present, the system optionally inquires, in step 85, if a supervisor override has been entered, based on additional information that is available to a supervisor at the site but not incorporated in the assigned priorities, that would override the higher priority assigned to the restricted activity. If the answer to the question in step 85 is "yes," the system allows the movable entity to continue it's present activities (with any suitable constraints imposed), in step 83, and recycles to step 71 or to another suitable point in the procedure. If the answer to the question in step 85 is "no," or if step 85 is not present, the system provides a signal advising the entity, the central station, or both that the movable entity's present location is within a present or future buffer zone BZ(t) for the scheduled or ongoing restricted activity and that the movable entity should be moved, in step 87. Preferably, the restricted activity priority increases with the perceived seriousness of the maximum credible hazard or threat associated with the restricted activity.

Although the invention has thus far been described for use in a scheduled restricted activity, the invention can also be used to monitor locations of, and responses by, movable entities when an unscheduled restricted activity, such as an industrial emergency, occurs at the site. In an emergency situation, the central station receives information on the emergency, determines the nature of the emergency and any special precautions that may apply, determines an applicable buffer zone for the emergency, determines which, if any, of the movable entities may be adversely affected by the ongoing emergency, and transmits emergency information including at least one of: (1) location of the emergency on the site; (2) nature of the emergency; (3) special precautions, if any, to be taken because of the emergency; (4) identity and location of any movable entities within the buffer zone that should be moved elsewhere; and (5) an "all-clear" signal when the emergency has been fully responded to or contained and no longer poses a threat or hazard to any movable entity. The procedure shown in the flow chart in FIG. 6 is also applicable for practicing the invention where an emergency situation is encountered. Where an emergency occurs, the priority set for this (unscheduled) restricted activity is preferably set higher than the highest priority for any normal work activity on the site.

If a movable entity, which is within a buffer zone for a scheduled restricted activity or emergency, is not moved within a selected time after the central station transmits the restricted activity or emergency information, the central station can transmit an alarm signal, identifying the movable entity and its location and requiring in stronger terms that the movable entity be moved elsewhere, or can dispatch a person with authority to forcibly move the movable entity out of the scheduled or unscheduled buffer zone.

The invention can be used: at open pit mining and other mineral extraction sites (oil, gas, coal, etc.); at outdoor construction sites; at "indoor" construction sites under some circumstances; at sites where a hazardous substance cleanup occurs; at sites where a hazardous substance is used in a process and a portion of the hazardous substance is unavoidably discharged; at sites where an emergency develops, and at sites using autonomous or remotecontrolled equipment, among other activities.

The communications signals used for exchange of inquiries and information between an LD module and a central station may be part of an analog cellular system (such as AMPS or NAMPS), a digital cellular system (such as IS-54 or IS-95), a cellular digital packet data system, a personal communications services (PCS) system, a Digital European Cordless Telecommunications (DECT) system, a radiopaging system, a nationwide wireless network, a conventional land mobile radio system, radio data networks (such as ARDIS and RAM Mobile Data), Metricom's Ricochet Micro Cellular Data Network, a radiofrequency or infrared WLAN, an analog or digital microwave relay system, a geostationary satellite system, or a low earth orbit (LEO) system, among others. These communication systems are summarized by S. D. Elliott and D. J. Dailey in *Wireless Communications for Intelligent Transportation Systems*, Artech House, Boston, 1995, pp. 11–32, and are discussed in greater detail in the remainder of this book. The communications signals may also be part of a Group Special Mobile (GSM) pan-European system, as discussed by D. M. Balston and C. Watson in *Cellular Radio Systems*, ed. by D. M. Balston and R. C. V. Macario, Artech House, Boston, 1993, pp. 153–206.

I claim:

1. A method of monitoring operation of a movable entity at an activity site, the method comprising the steps of:

determining the location of a designated movable entity at an activity site, using location determination (LD) signals received from two or more LD signal sources;

when the designated movable entity becomes involved in one or more of a selected group of restricted activities, determining a restricted activity variable buffer zone that surrounds at least one scheduled location or present location of the designated movable entity, and transmitting restricted activity information including at least one of (1) an indicium identifying the designated movable entity, (2) present location of the designated movable entity, (3) an anticipated location of the designated movable entity when a restricted activity is scheduled to occur, (4) physical extent of the restricted activity exclusion zone, (5) a time at which the designated movable entity will first become involved in the restricted activity, (6) a time after which the designated movable entity will no longer be involved in the restricted activity, and (7) any special precaution that should be taken during at least one time when a restricted activity occurs, where at least one of the buffer zone location and buffer zone size can vary with time;

transmitting said restricted activity information to a second movable entity at said activity site;

determining a location and present activity of said second movable entity;

determining a priority associated with a present activity of said movable entity, and comparing the movable entity priority with a priority associated with said restricted activity; and transmitting a signal indicating that said second movable entity should be moved to outside said buffer zone, only if the location of said second movable is within said buffer zone and the movable entity priority is not greater than the restricted activity priority.

2. The method of claim 1, further comprising the step of selecting said buffer zone with reference to said restricted activity in which said designated movable entity becomes involved.

3. The method of claim 1, further comprising the steps of:

determining a location of said second movable entity; and transmitting a signal indicating that said second movable entity should be moved to outside said buffer zone, if the location of said second movable is within said buffer zone.

4. The method of claim 1, further comprising the step of choosing said second movable entity at said activity site from the class consisting of a human being, a vehicle, a movable equipment item, and a movable structure.

5. The method of claim 1, further comprising the step of audibly or visually presenting at least one of said restricted activity information and a location of said second movable entity to said second movable entity.

6. The method of claim 1, further comprising the step of choosing said movable entity at said activity site from the class consisting of a human being, a vehicle, a movable equipment item, and a movable structure.

7. The method of claim 1, further comprising the step of transmitting said restricted activity information to a central monitoring station for said activity site.

8. The method of claim 1, further comprising the step of selecting said LD signal sources from a group of satellite-based sources consisting of GPS signal sources, GLONASS signal sources and LEO signal sources.

9. The method of claim 1, further comprising the step of selecting said LD signal sources from a group of ground-based sources consisting of Loran signal sources, Tacan signal sources, Decca signal sources and Omega signal sources.

10. A method of monitoring operation of an activity structure at an activity site, the method comprising the steps of:

receiving the location of a selected activity structure at an activity site, using location determination (LD) signals received from two or more LD signal sources;

when the activity structure becomes involved in one or more of a selected group of restricted activities, determining a restricted activity variable buffer zone that surrounds the activity structure and transmitting restricted activity information including at least one of (1) an indicium identifying a first movable entity, (2) location of the activity structure, (3) physical extent of the buffer zone, (4) a time at which the first movable entity will first become involved in the restricted activity, (5) a time after which the first movable entity will no longer be involved in the restricted activity, (6) any special precaution that should be taken during at least one time when a restricted activity occurs, for use by a least one movable entity at the activity site, (7) whether the first movable entity is excluded from the buffer zone; and (8) whether the first movable entity may continue its present activities within the buffer zone, where at least one of the buffer zone location and buffer zone size can vary with time;

transmitting said restricted activity information to a second movable entity at said activity site;

determining a location and present activity of said second movable entity;

determining a priority associated with a present activity of said movable entity, and comparing the movable entity priority with a priority associated with said restricted activity; and transmitting a signal indicating that said second movable entity should be moved to outside said buffer zone, only of the location of said second movable is within said buffer zone and the movable entity priority is not greater that the restricted activity priority.

11. The method of claim 10, further comprising the step of selecting said buffer zone with reference to said restricted activity in which said designated movable entity becomes involved.

12. The method of claim 10, further comprising the steps of:

determining a location of said second movable entity; and transmitting a signal indicating that said second movable entity should be moved to outside said buffer zone, if the location of said second movable is within said buffer zone.

13. The method of claim 10, further comprising the step of choosing said second movable entity at said activity site from the class consisting of a human being, a vehicle, a movable equipment item, and a movable structure.

14. The method of claim 10, further comprising the step of audibly or visually presenting at least one of said restricted activity information and a location of said second movable entity to said second movable entity.

15. The method of claim 10, further comprising the step of choosing said movable entity at said activity site from the class consisting of a human being, a vehicle, a movable equipment item, and a movable structure.

16. The method of claim 10, further comprising the step of transmitting said restricted activity information to a central monitoring station for said activity site.

17. The method of claim 10, further comprising the step of selecting said LD signal sources from a group of satellite-based sources consisting of GPS signal sources, GLONASS signal sources and LEO signal sources.

18. The method of claim 10, further comprising the step of selecting said LD signal sources from a group of ground-based sources consisting of Loran signal sources, Tacan signal sources, Decca signal sources and Omega signal sources.

19. Apparatus for monitoring operation of a movable entity at an activity site, the apparatus comprising:

a location determination (LD) signal module for receiving LD signals and determining the present location of the LD module using the LD signals, attached to a movable entity a communication module for receiving restricted activity information on a restricted activity that will occur is occurring on an activity site, including at least one location at which the restricted activity will occur or is occurring; and a computer that is programmed:

to receive the LD module present location and the restricted activity information;

to determine at least one restricted activity buffer zone that surrounds the at least one location at which the restricted activity is scheduled to occur or is occurring, where at least one of the buffer zone location and buffer zone size is allowed to vary with time;

to determine whether the LD module present location is within the at least one restricted activity buffer zone; and when the LD module present location is within the at least one restricted activity exclusion zone, to transmit a signal indicating that the movable entity to which the LD module is attached is within the at least one restricted activity buffer zone; wherein said computer is further programmed:

to determine a priority associated with a present activity of said movable entity, and to compare the movable entity priority with a priority associated with said restricted activity; and to transmit a signal indicating that said movable entity should be moved to outside said buffer zone, only if the location of said movable is within said buffer zone and the movable entity priority is not greater than the restricted activity priority.

20. The apparatus of claim 19, wherein said computer is further programmed to determine said buffer zone with reference to at least one hazard associated with said restricted activity.

21. The apparatus of claim 19, wherein said restricted activity information includes at least one of: (1) present location of said movable entity, (2) a scheduled location of said movable entity when a restricted activity is scheduled to occur, (3) physical extent of said restricted activity exclusion zone, (4) a time at which said movable entity will first become involved in the restricted activity, (5) a time after which said movable entity will no longer be involved in the restricted activity, and (6) any special precaution that should be taken during at least one time when a restricted activity occurs.

22. The apparatus of claim 19, wherein said computer is further programmed to transmit a signal indicating that said movable entity should be moved to outside said buffer zone, if the location of said movable to which said LD module is attached is within said buffer zone.

23. The apparatus of claim 19, further comprising at least one of a visually perceptible display and an audibly perceptible display for presenting at least one of said restricted activity information and a location of said movable entity.

24. The apparatus of claim 19, wherein said LD signals are received from a group of satellite-based LD signal sources consisting of GPS signal sources, GLONASS signal sources and LEO signal sources.

25. The apparatus of claim 19, wherein said LD signals are received from a group of ground-based LD signal sources consisting of Loran signal sources, Tacan signal sources, Decca signal sources and Omega signal sources.

\* \* \* \* \*